United States Patent [19]

Plunkett

[11] 4,258,302
[45] Mar. 24, 1981

[54] APPARATUS FOR MAINTAINING SYNCHRONISM OF AN INVERTER-SYNCHRONOUS MACHINE DRIVE SYSTEM AT LIGHT OR ZERO MACHINE LOADS

[75] Inventor: Allan B. Plunkett, Scotia, N.Y.

[73] Assignee: General Electric Company, Schenectady, N.Y.

[21] Appl. No.: 79,693

[22] Filed: Sep. 28, 1979

[51] Int. Cl.³ .......................... H02P 5/34; H02P 5/36; H02P 7/42
[52] U.S. Cl. .................................. 318/723; 318/722; 318/802; 318/810
[58] Field of Search ............... 318/720, 721, 722, 723, 318/798, 799, 800, 801, 802, 807, 810, 811, 812

[56] References Cited

U.S. PATENT DOCUMENTS

| | | | |
|---|---|---|---|
| 3,784,889 | 1/1974 | Michael | 318/720 |
| 3,896,348 | 7/1975 | Loderer | 318/810 X |
| 4,023,083 | 5/1977 | Plunkett | 318/810 X |
| 4,047,083 | 9/1977 | Plunkett | 318/807 |
| 4,088,934 | 5/1978 | D'Atre et al. | 318/802 |
| 4,172,991 | 10/1979 | Akamatsu et al. | 318/722 |

FOREIGN PATENT DOCUMENTS

| | | | |
|---|---|---|---|
| 2343612 | 3/1975 | Fed. Rep. of Germany | 318/802 |
| 2516247 | 11/1975 | Fed. Rep. of Germany | |
| 2557710 | 6/1977 | Fed. Rep. of Germany | 318/802 |

OTHER PUBLICATIONS

"Inverter Fed Induction Motor Drive Using Power Factor Control" by S. A. Rosenberg et al., pp. 810-813 of the Conference Record of the IEEE/IAS Annual Convention, Chicago, Ill., 1976.

*Primary Examiner*—Gene Z. Rubinson
*Assistant Examiner*—Richard M. Moose
*Attorney, Agent, or Firm*—William H. Steinberg; James C. Davis, Jr.; Paul R. Webb, II

[57] ABSTRACT

To achieve synchronization of an inverter-synchronous machine drive system, feedback of a phase angle signal, derived in part from stator current drawn by, and voltage supplied to, the synchronous machine, is provided to control the frequency of inverter thyristor conduction. At light or zero synchronous machine load conditions, machine stator current may be of insufficient magnitude to permit derivation of the phase angle feedback signal; therefore, substitute simulated stator current signals, proportional to a preselected combination of inverter thyristor gating pulses, are utilized to derive the phase angle feedback signal, thereby allowing inverter-synchronous machine drive synchronism to be maintained.

8 Claims, 15 Drawing Figures

APPARATUS FOR MAINTAINING SYNCHRONISM OF AN INVERTER-SYNCHRONOUS MACHINE DRIVE SYSTEM AT LIGHT OR ZERO MACHINE LOADS

BACKGROUND OF THE INVENTION

This invention relates to apparatus for synchronizing an inverter-synchronous machine drive system and for maintaining such inverter-synchronous machine synchronism at light or zero synchronous machine load conditions.

In many industrial applications where operator control of synchronous machine speed is desired, synchronous machine drive systems are employed. Typically, such synchronous machine drive system comprise a synchronous machine and an inverter which is configured of a plurality of pairs of solid state switching devices, typically thyristors, each pair of thyristors being coupled in series aiding fashion, and each of the pairs coupled across a unidirectional current source. The junction between thyristors of each thyristor pair is coupled to a respective synchronous machine phase. Rendering the thyristors conductive in a predetermined sequence causes the synchronous machine to be supplied with alternating current and hence to commence rotation. By adjusting the frequency at which inverter thyristors conduct, the frequency of alternating current potential supplied to the synchronous machine and hence, synchronous machine speed, can be varied accordingly.

To achieve peak inverter-synchronous machine drive system performance, it is desirable to synchronize the inverter to the synchronous machine, that is, to adjust the frequency of inverter thyristor conduction to maintain commutation of inverter thyristors by synchronous machine back EMF. Such apparatus for achieving inverter-synchronous machine drive synchronism is described and claimed in the copending application Ser. No. 945,625, entitled "Method and Apparatus for Control of Inverter Synchronous Machine Drive Systems", filed by A. B. Plunkett and F. G. Turnbull on Sept. 25, 1978 and assigned to the assignee of the present invention. As taught in that application, inverter-synchronous machine drive system synchronization is achieved by adjusting the frequency of inverter thyristor conduction in accordance with a phase angle feedback signal which is proportional to the difference in magnitude between an operator-commanded machine phase angle relationship and the actual machine phase angle relationship between stator current and air gap flux.

While the method and apparatus described and claimed in the aforementioned application Ser. No. 945,625 achieves inverter-synchronous machine drive system synchronism over a wide range of machine load conditions, inverter-synchronous machine drive system synchronism may not always be maintained at light or zero machine load conditions. This is because machine stator current drawn during intervals of light or zero machine loads may be of insufficient magnitude to permit computation of the actual machine phase angle relationship magnitude. The apparatus of the present invention alleviates this difficulty thereby allowing inverter-synchronous machine drive system synchronism to be maintained even at light or zero machine load conditions.

BRIEF SUMMARY OF THE INVENTION

Briefly, in accordance with the preferred embodiment of the invention, apparatus for use with an inverter-synchronous machine drive system, for controlling the conduction frequency of inverter solid state switching devices in accordance with operator commands to achieve inverter-synchronous machine synchronism and to maintain inverter-synchronous machine synchronism at light or zero machine load conditions, comprises a first circuit coupled to the inverter and adapted to be supplied with a parameter command signal proportional to an operator-commanded inverter-synchronous machine drive system parameter magnitude and with a fixed-value phase angle signal, proportional to a preselected machine phase angle relationship magnitude. The first circuit provides a machine phase angle command signal, proportional to a desired machine phase angle relationship between synchronous machine air gap flux and stator current, in accordance with the preselected machine phase angle relationship magnitude during intervals of synchronous machine start-up and in accordance with the difference between the operator-commanded inverter-synchronous machine drive system parameter magnitude and the actual inverter synchronous machine drive system parameter magnitude during intervals other than synchronous machine start-up.

A second circuit is coupled to the inverter and supplies an output signal proportional to the actual phase angle relationship between synchronous machine air gap flux and stator current in accordance with the difference in the conduction periods of solid state switching devices of each pair of inverter solid state switching devices during intervals of light synchronous machine loads and in accordance with the actual synchronous machine stator currents during other than intervals of light synchronous machine loads. Inverter solid state switching device conduction frequency is controlled by a third circuit, coupled to the inverter and to the first and second circuits, in accordance with the difference in magnitude between the first circuit machine phase angle command signal and the second circuit output signal, to achieve and maintain inverter-synchronous machine drive synchronism, particularly at light or zero synchronous machine load conditions.

It is an object of the present invention to provide apparatus for synchronizing the inverter and synchronous machine of an inverter-synchronous machine drive system;

It is another object of the invention to provide apparatus for achieving and maintaining inverter-synchronous machine drive synchronism particularly during light or zero synchronous machine load conditions.

DETAILED DESCRIPTION OF THE DRAWINGS

The features of the invention believed to be novel are set forth with particularly in the appended claims. The invention itself, however, both as to organization and method of operation, together with further objects and advantages thereof, may best be understood by reference to the following description taken in conjunction with the accompanying drawings in which:

FIG. 4b is a block diagram of one of the flux measuring circuits of FIG. 4a.

DETAILED DESCRIPTION OF THE PREFERRED EMBODIMENT

Figure 1:
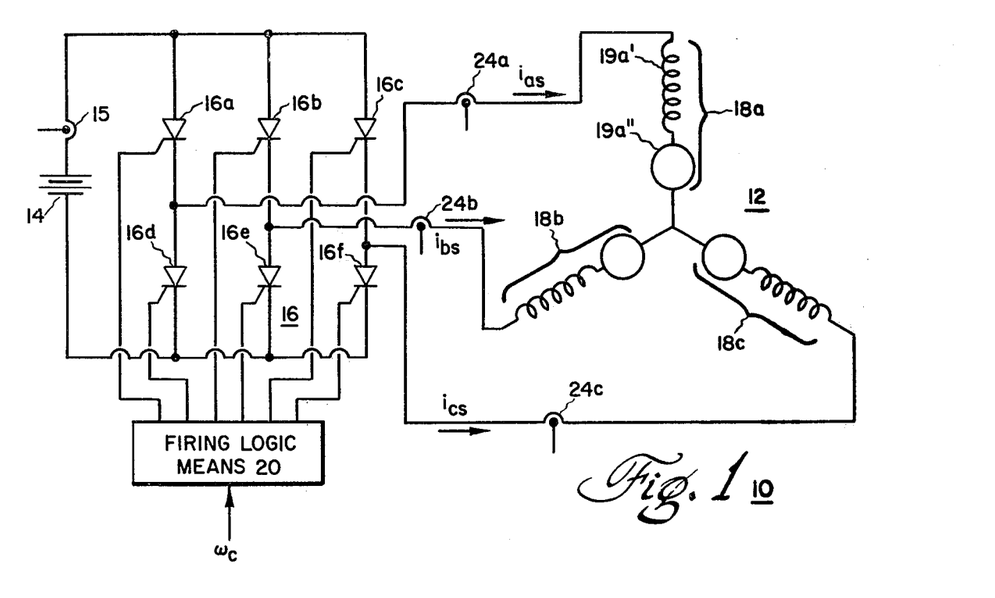
FIG. 1 is a schematic diagram of an inverter-synchronous machine drive system for use with the present invention.

FIG. 1 illustrates an inverter-synchronous machine drive system 10 comprised of a synchronous machine 12 which is excited from a unidirectional current source, shown as a battery 14, by an inverter 16. Inverter 16 typically comprises a plurality of pairs of serially-coupled, solid state switching devices, such as thyristors, corresponding in number to the number of synchronous machine phases. Thus, when synchronous machine 12 is configured of a three phase synchronous machine, inverter 16 comprises three pairs of serially-coupled thyristors 16a and 16d, 16b and 16e and 16c and 16f, which pairs are each coupled across the serial combination of battery 14 and a current sensor 15. The junction between each of thyristors 16a and 16d, 16b and 16e and 16 c and 16f, respectively, is coupled to an associated one of phases 18a, 18b and 18 c, respectively, of synchronous machine 12, with each machine phase such as 18a being represented by the serial combination of a phase inductance 19a' and a voltage source 19a" representing back electromotive force (EMF).

Each of thyristors 16a through 16f is gated into conduction in a predetermined sequence at an appropriate frequency in response to a gating signal supplied from firing logic means 20. The frequency of thyristor gating signals supplied by firing logic means 20 varies in accordance with a frequency command signal $\omega_c$ impressed at the frequency command input of firing logic means 20. Various thyristor firing circuits exist and selection of a specific one of such circuits will depend upon design parameters. Therefore the details of firing logic means 20 are not shown. For a further, more detailerd description of such thyristor firing circuits, reference should be had to Chapter 4 of the *General Electric Silicon Controlled Rectifier Handbook*, published by Semiconductor Products Division of the General Electric Company, Syracuse, New York, (1972).

In addition to current sensor 15, which is typically configured of a current transformer or the like, drive system 10 includes current sensors 24a, 24b and 24c, which are each coupled in series with one of machine phases 18a, 18b and 18c, respectively, and inverter 16. Each of sensors 24a, 24b and 24c provides an output signal proportional to synchronous machine 12 stator currents $i_{as}$, $i_{bs}$ and $i_{cs}$, respectively.

Figure 2:
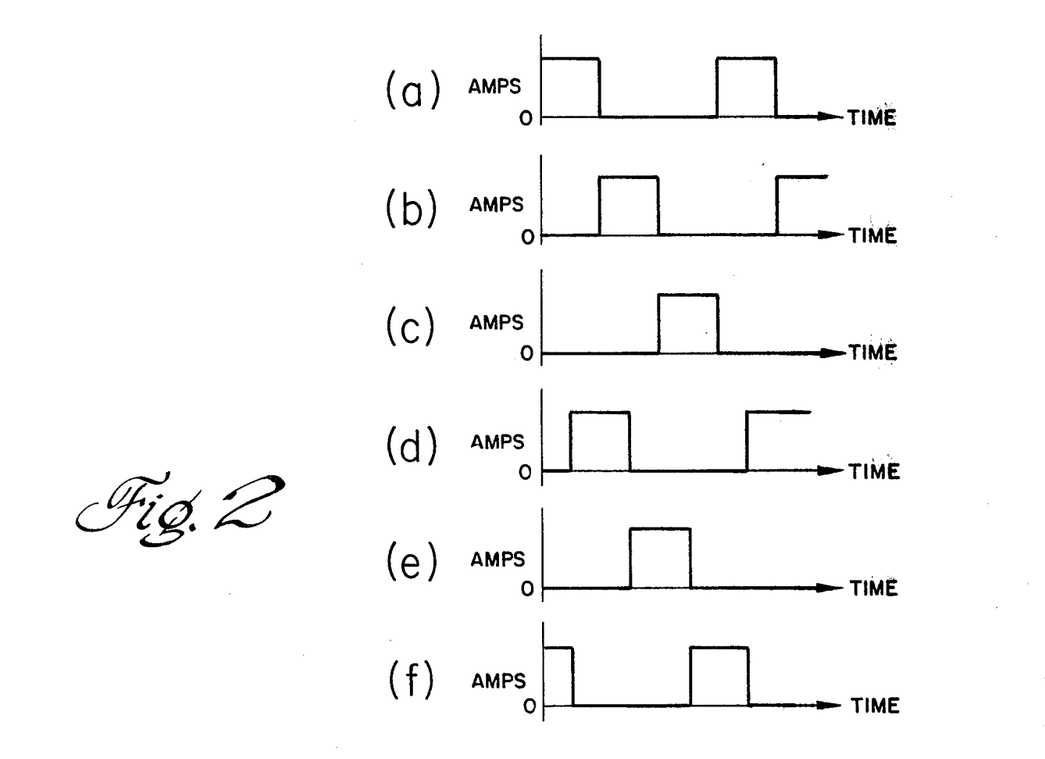
FIGS. 2a-2f illustrate the respective conduction intervals of each of the thyristors within the inverter of FIG. 1.

Operation of inverter synchronous machine drive system 10 may best be understood by reference to FIGS. 2a-2f which illustrate the conduction sequence of thyristors 16a, 16b, 16c, 16f, 16e and 16d, respectively, in response to firing signals from firing logic means 20. As indicated in FIGS. 2a, 2b and 2c, thyristors 16a, 16b and 16c, respectively are sequentially rendered conductive with each thyristor remaining conductive for a period of duration $\tau/3$ where $\tau=1/f$, with f being the frequency of thyristor conduction which varies in accordance with the inverter frequency command signal $\omega_c$. As evidenced by FIGS. 2d, 2e and 2f, thyristors 16f, 16e and 16 d, respectively, are sequentially rendered conductive after an interval of duration $\tau/6$ beginning with the initiation of conduction of thyristors 16a, 16b and 16c, respectively. Each of thyristors 16a-16f, respectively, is commutated, that is, current conduction through each thyristor is extinguished, respectively, at a predetermined instant following initiation of thyristor conduction, by back EMF of synchronous machine 12. Rendering thyristors 16a-16f conductive in the manner described above supplies machine 12 with stator currents $i_{as}$, $i_{bs}$ and $i_{cs}$ thereby causing the machine to commence rotation.

Figure 3:
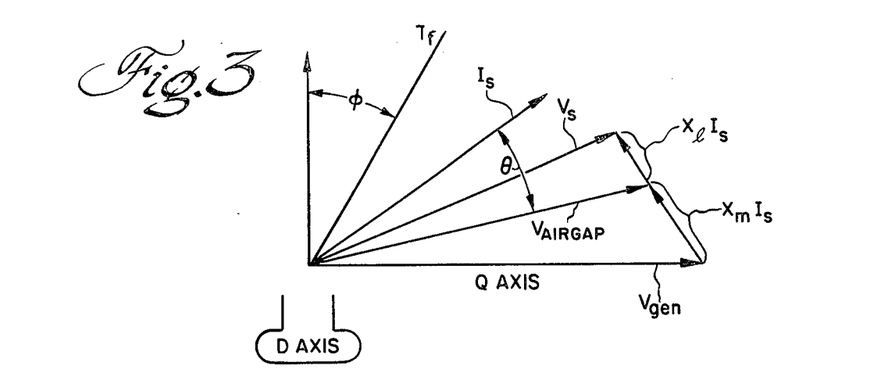
FIG. 3 is a vector diagram indicating the phase angle relationship between respective inverter-synchronous machine drive system voltages and currents.

Control of inverter-synchronous machine drive system 10 to maintain load commutation, that is, to maintain commutation of inverter thyristors by synchronous machine 12 back EMF, will now be explained by reference to FIG. 3, which is a vector representation of inverter-synchronous machine drive system voltages and currents as referenced with respect to the direct and quadrature axes of synchronous machine 12. The voltage (back EMF) generated by field flux of synchronous machine 12 is represented by the vector quantity $V_{gen}$ lying along the the quadrature of Q axis. The vector quantity $I_s$ represents the stator current drawn by synchronous machine 12 and leads the vector $V_{gen}$. Synchronous machine 12 terminal voltage is represented by the vector quantity $V_s$ which is equal to the vector difference between $V_{gen}$ and the sum of the vector quantities $X_m I_s$ and $X_\lambda I_s$, which represent the internal machine voltage drops due to the stator magnetizing reactance $X_m$ and the stator leakage reactance $X_\lambda$, respectively. The vector quantity $V_{air\,gap}$, representing the air gap voltage which would be sensed if a sensing coil were placed in synchronous machine 12, is equal to the difference between vectors $V_{gen}$ and $X_m I_s$. Synchronous machine air gap flux can be derived from the air gap voltage by integration. Unlike other methods for deriving air gap flux, this method provides an air gap flux signal which remains relatively constant during transient load changes since transient current changes primarily affect the vector quantity $X_\lambda I_s$ and not $X_m I_s$, as the air gap voltage, which is approximately equal to the voltage across the transient reactance $X'_d$ of synchronous machine 12, changes with a relatively long time constant. The angle between the line $T_f$ and the direct or D axis represents the inverter thyristor firing angle $\phi$, that is, the angular phase displacement between passage by a fixed point of one of the synchronous machine rotor poles and initiation of inverter thyristor conduction. In practice, synchronous machine 12 exhibits a high reactance and therefore, the inverter thyristors must be fired considerably in advance of desired inverter thyristor switching intervals since the inverter commutation time delay is large. Also, the inverter thyristor commutation delay is a function of inverter current and increases as inverter current increases.

In order for load commutation to be maintained, synchronous machine current must lead synchronous machine stator voltage so that a net voltage of sufficient amplitude is present across an associated pair of machine phases at the instant commutation of a respective thyristor is desired. In terms of the vectors illustrated in FIG. 3, $I_s$ must lead $V_s$. Note that if synchronous machine stator current lags stator voltage, then there will not be a net reverse voltage available for thyristor commutation. Regulating inverter thyristor conduction in accordance with the inverter thyristor firing angle $\phi$ would require a complex function generator because the angle varies nonlinearly with inverter load current. However, the phase angle $\theta$ between the vectors $I_s$ and $V_{air\,gap}$ varies little with inverter load current and therefore can be employed for regulation of inverter thyristor conduction, thereby eliminating the need for a complex function generator.

The phase angle $\theta$ is relatively easily determined from basic machine operating parameters since it is directly related to the machine torque. Sin $\theta$ can be calculated from the expression:

$$\sin \theta = 3\omega_b T_e / 4p |\psi_m| |I_s|$$

where:
 $T_e$ = machine torque
 $\psi_m$ = air gap flux (volts)
 $I_s$ = stator current (in amps)
 $\omega_b$ = rated machine speed at which $|\psi_m| = \equiv V_{air\,gap}|$
 $p$ = the number of synchronous machine poles The torque, $T_e$ is defined in terms of the direct and quadrature axes components of air gap flux and stator current and is expressed by:

$$T_e = 4p/3\omega_B[\psi_{mq} i_{ds} - \psi_{md} i_{qs}]$$

Substituting the expression for torque as dereived in equation (2) into equation (1) yields an expression for sin $\theta$ represented by:

$$\sin \theta = (\psi_{mq} i_{ds} - \psi_{md} i_{qs}) / |I_s| |\psi_m|$$

Figure 4A:
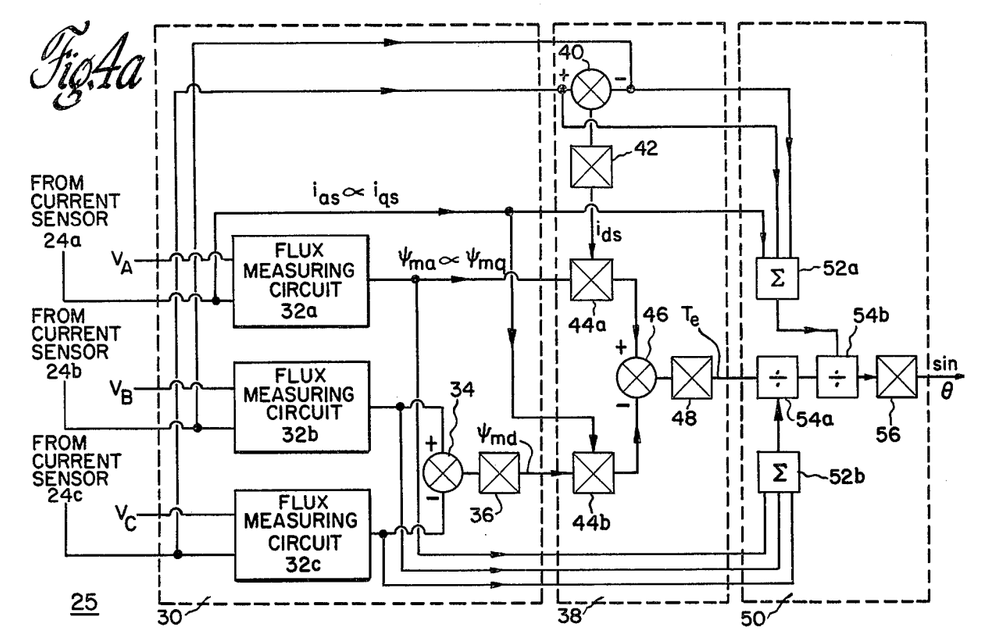
FIG. 4a is a block diagram of a circuit for generating a signal proportional to the phase angle relationship between the stator current and air gap flux of the synchronous machine of FIG. 1.

An angle commutation circuit 25 for computing sin $\theta$ in accordance with equation (1) is illustrated schematically in FIG. 4. Circuit 25 includes a first sub-circuit 30 for supplying a pair of output signals proportional to the synchronous machine direct and quadrature axes air gap flux components designated $\psi_{md}$ and $\psi_{mq}$, respectively, from synchronous machine terminal voltages and stator currents. Sub-circuit 30 includes three identically configured flux measuring circuits 32a, 32b and 32c which are each coupled to synchronous machine 12 and one of currents sensors 24a, 24b and 24c, respectively, of FIG. 1. Each of flux measuring circuits 32a, 32b and 32c supplies an output signal proportional to synchronous machine 12 air gap flux components $\psi_{ma}, \psi_{mb}$ and $\psi_{mc}$, respectively, in accordance with synchronous machine terminal voltages $V_A$, $V_B$ and $V_C$, respectively, and synchronous machine stator currents $i_{as}, i_{bs},$ and $i_{cs}$, respectively.

Figure 4B:
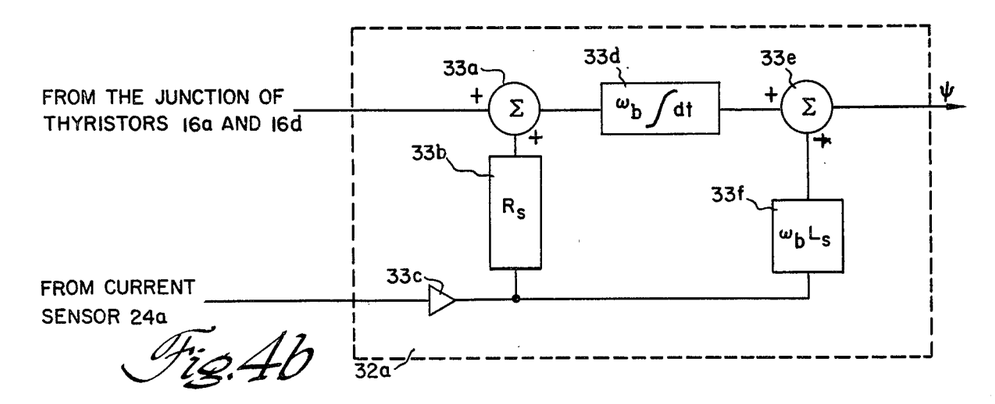

Flux measuring circuits 32a, 32b and 32c are each identically configured. Therefore, only the details of flux measuring circuit 32a are set forth. Referring to FIG. 4b which is a block diagram of flux measuring circuit 32a, it can be seen that flux measuring circuit 32a includes a first summing amplifier 33a which is coupled at the noninvert input to the junction between thyristors 16a and 16d of FIG. 1. The invert input of summing amplifier 33a is coupled by the serial combination of resistance 33b, proportional in magnitude to the stator resistance $R_S$ of machine 12, and a polarity inverter 33c, to current sensor 24a of FIG. 1. Summing amplifier 33a supplies an output voltage proportional to the difference in magnitude between input voltages supplied to the noninvert and invert summing amplifier inputs. Thus, the summing amplifier output voltage is proportional to the difference in magnitude between synchronous machine terminal voltage and the synchronous machine stator resistance voltage drop. An integrator 33d, coupled to the output of summing amplifier 33a provides an output voltage proportional to the product of the integral of the integrator input voltage and the magnitude of the rated machine frequency $\omega_b$. The output voltage of integrator 33d is supplied to the noninvert input of a second summing amplifier 33e. The invert input of summing amplifier 33e is coupled to the junction of resistances 33b and polarity inverter 33c by a second resistance 33f, proportional in magnitude to the product of the rated machine frequency $\omega_b$ and the synchronous machine stator inductance $L_s$. In accordance with the difference magnitude between voltages supplied to the invert and noninvert inputs of summing amplifier 33e, the summing provides an output voltage proportional to synchronous machine air gap flux. For a further, more detailed understanding of the operation of flux measuring circuit 32a, reference should be had to my copending application "Method and Apparatus for Generating an Air Gap Flux Signal for an AC Machine from AC Line Voltages and Current Values", Ser. No. 14,941, filed on Feb. 29, 1979 and assigned to General Electric Company.

Referring back to FIG. 4a, second sub-circuit 38 supplies an output signal proportional to synchronous machine 12 torque $T_e$ in accordance with equation (2) as follows. The output signal of each of current sensors 24b and 24c of FIG. 1 is supplied to the first and second inputs, respectively, of a summing amplifier 40. Summing amplifier 40 provides an output signal, proportional to the difference in magnitude between input signals supplied to the first and second summing amplifier inputs, to the input of a scaling amplifier 42 which is adjusted with gain proportional to $1/\sqrt{3}$. The resultant signal provided at the output of scaling amplifier 42 is thus proportional to the direct axis stator current component magnitude $i_{ds}$.

A first multiplier 44a is coupled at a first input to flux measuring circuit 32a and at a second input to the output of scaling amplifier 42. In accordance with signals received at the first and second multiplier inputs proportional to $\psi_{mq}$ and $i_{ds}$, respectively, multiplier 44a provides an output signal proportional to the product of $\psi_{mq}$ and $i_{ds}$. A second multiplier 44b is coupled at the first input to the output of current sensor 24 of FIG. 1 and is coupled at the second input to the output of scaling amplifier 36. In accordance with the output signal magnitude of current sendor 24a, which is proportional to $i_{as}$, and also $i_{qs}$ and in accordance with the output signal magnitude of scaling amplifier 36, which is proportional to $\psi_{md}$, multiplier 44b supplies an output signal which is proportional in magnitude to the product of $i_{qs}$ and $\psi_{md}$. The output signals provided by multipliers 44a and 44b are supplied to the first and second inputs, respectively, of a second summing amplifier 46. In accordance with the magnitude of input signals supplied to the first and second summing amplifier inputs, summing amplifier 46 provides an output signal proportional to the magnitude difference therebetween, which output signal is therefore proportional to the expression $(\psi_m d^i{}_{qs} - \psi_m q^i{}_{ds})$. A second scaling amplifier 48, adjusted with gain proportional to $4p/3\omega_b$, scales the output signal of summing amplifier 46 to yield a signal proportional to synchronous machine 12 torque $T_e$ in accordance with equation (2).

A third subcircuit 50 provides an output signal proportional to sin $\theta$ in accordance with the output signals supplied by subcircuits 30 and 38 proportional to synchronous machine air gap flux and synchronous machine torque, respectively. Sub-circuit 50 includes a first summing means 52a which is supplied at a first, second and third input with output signals from current sensors 24a, 24b and 24c, respectively, all of FIG. 1. Summing means 52a supplies an output signal proportional to the square root of the sum of the square of the input signal magnitudes supplied to each of the first, second and third summing means inputs, which output signal is therefore proportional to the synchronous machine stator current magnitude $|I_s|$. Summing means 52b is supplied at the first, second and third inputs with output signals from flux measuring circuits 32a, 32b and 32c, respectively, and provides an output signal proportional to the synchronous mchine air gap flux magnitude $|\psi_m|$. Although not shown, each of summing means 52a and 52b is typically configured of a trio of full wave rectifier bridges, the output of each bridge being coupled across the input of a scaling amplifier adjusted with preselected gain. The output signal from each of summing means 52b and 52a is supplied to the denominator input of each of a pair of dividers 54a and 54b, respectively. Divider 54a is supplied at the numerator input with the output signal of sub-circuit 38 which is proportional to $T_e$. Divider 54b is supplied at the numerator input with the output signal provided by divider 54a. The output signal provided by divider 54b is supplied to the input of a scaling amplifier 56 adjusted with gain proportional to $3\omega_b/4_p$. Scaling amplifier 56, in accordance with the output signal magnitude of divider 54b, provides an output signal proportional to sin $\theta$.

Figure 5:
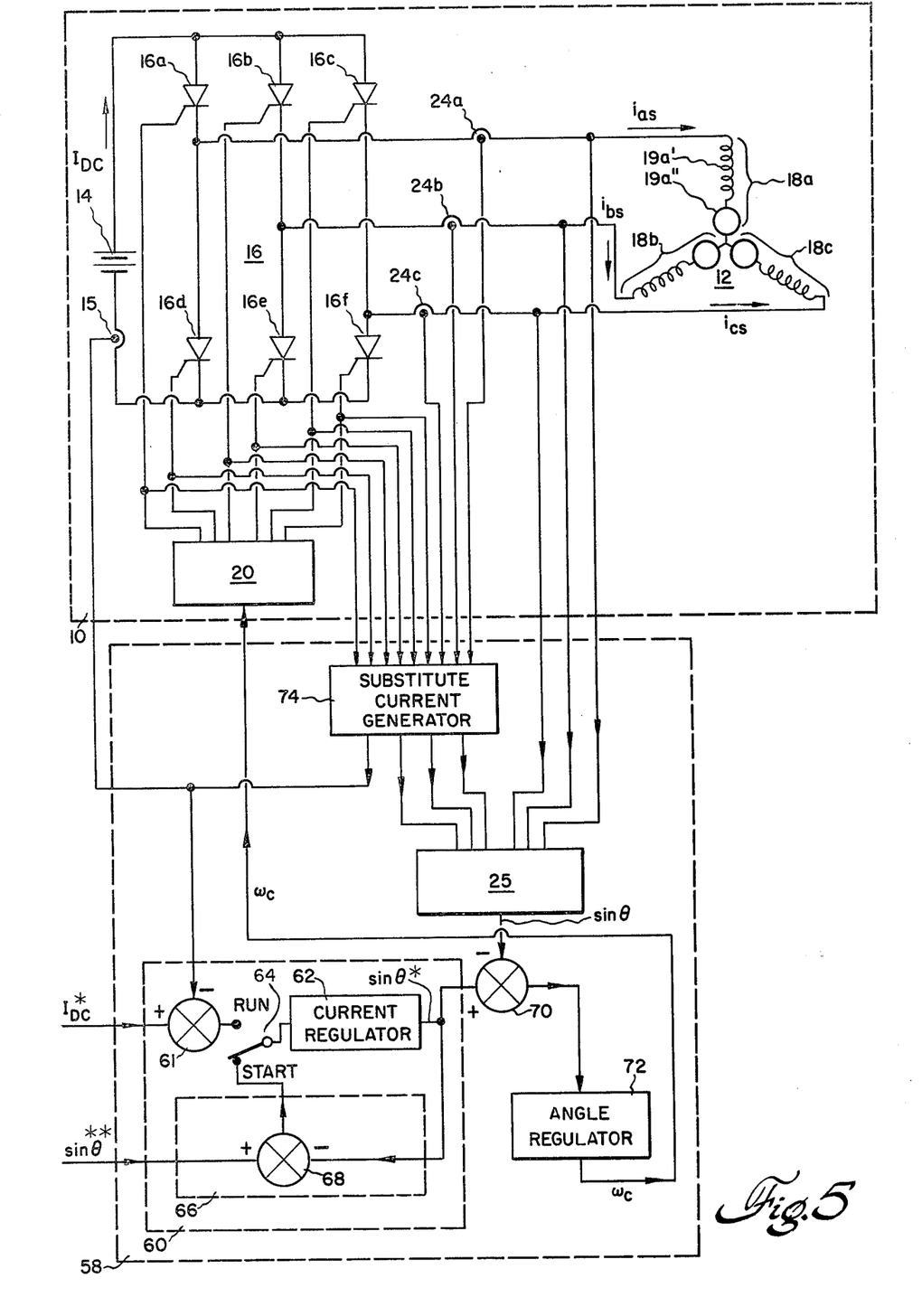
FIG. 5 is a block diagram of a control apparatus of the present invention coupled to an inverter synchronous machine drive system.

FIG. 5 details a control apparatus 58 for maintaining load commutation and hence synchronism of inverter-synchronous machine drive system 10. Control apparatus 10 includes a first control loop 60 for generating a machine phase angle command signal, designated sin $\theta^*$, proportional to a desired machine phase angle relationship magnitude, in accordance with the operator-commanded magnitude of a preselected inverter-synchronous machine drive system parameter such as inverter link current. When a signal, which varies in accordance with an operator-commanded inverter link current magnitude $I_{DC}^*$ is summed at a summing amplifier 61 with the output signal of current sensor 15, which is proportional to the actual inverter link current magnitude $I_{DC}$, a signal is provided at the output of summing amplifier 61 proportional to the difference in magnitude between signals supplied to the first and second summing amplifier inputs.

A current regulator 62, for supplying a machine phase angle command signal sin $\theta^*$ in accordance with the magnitude of the input signal supplied thereto, is coupled at the input by switch 64 to the output of summing amplifier 61, or into a second control loop 66.

When switch 64 is in the "run" position, current regulator 62 supplies the machine phase angle command signal sin $\theta^*$ in accordance with the summing amplifier 61 output signal magnitude.

Control loop 66 is designed with relatively high gain such that when switch 64 is in the "start" position, a loop will be completed about current regulator 62, permitting generation by current regulator 62 of a machine phas angle command signal proportional to a desired fixed-value machine phase angle relationship. A fixed-value phase angle signal sin $\theta^{}$, representing a preselected machine phase angle relationship magnitude for machine start up, is impressed at the first input of a summing amplifier 68 while the output of current regulator 62 is coupled to the second summing amplifier input to complete the loop about the current regulator. Under these conditions, a signal, proportional to the difference between sin $\theta^{}$ and the output signal of current regulator 62, is impressed at the current regulator input allowing a zero steady-state error, machine phase angle command signal, sin $\theta^*$ to be produced by current regulator 62.

Current regulator 62 is comprised of an amplifier having an integral plus proportional transfer characteristic. Various amplifier circuits having integral plus proportional transfer characteristics exist, and selection of such an amplifier circuit will depend upon design parameters. The details of the current regulator 62 are therefore not shown. For a more detailed discussion of amplifiers having integral plus proportional transfer characteristics, reference should be had to the text *Servomechanisms and Regulating System Design* by Chestnut and Mayer, John Wiley & Sons, 1955 at pps. 121-125.

The machine phase angle command signal sin $\theta^*$ generated by current regulator 62 is summed at a summing amplifier 70 with the machine phase angle signal sin $\theta$ provided by angle computation circuit 25 in accordance with synchronous machine terminal voltages and synchronous machine stator currents. Summing amplifier 70 yields a phase angle error signal proportional to the difference between sin $\theta^*$ and sin $\theta$. An angle regulator 72, comprised of an amplifier having an integral plus proportional transfer characteristic, generates, in accordance with the phase angle error signal provided by summing amplifier 70, the frequency command signal, $\omega_c$ which is supplied to firing logic means 20 to regulate the frequency of inverter thyristor conduction and thereby maintain inverter load commutation and hence inverter-synchronous machine drive synchronism.

At light or zero machine loads, stator current drawn by synchronous machine 12 may be of insufficient magnitude for angle computation circuit 25 to compute sin $\theta$. To alleviate this difficulty, a substitute current generator 74 supplies angle computation circuit 25 with the output signals of current sensors 24a, 24b and 24 c when machine 12 is not operating at conditions of light or zero load, while during light or zero motor load conditions, substitute current generator means 74 supplies angle computation circuit 25 with substitute current signals $I_A^*$, $I_B^*$ and $I_C^*$ which are representative of synchronous machine stator currents drawn during conditions of light motor loads. Substitute current signals $I_A^*$, $I_B^*$ and $I_C^*$ are generated as follows. During light or zero synchronous machine load conditions, stator current phase components $i_{as}$, $i_{bs}$ and $i_{cs}$ are each approximately equal to the amplitude difference of current passed by inverter thyristors 16a and 16d, inverter thyristors 16b and 16e and inverter thyristors 16c and 16f, respectively. As each of inverter thyristors 16a–16f is rendered conductive in response to a gating signal supplied by firing logic means 20, the difference in amplitude of current passed by each of thyristors 16a and 16d, 16b and 16e and 16c and 16f is proportional to the difference in amplitude of gating signals supplied to thyristors 16a and 16 d, 16b and 16e and 16c and 16f, respectively. At low values of inverter link current, the overlap in conduction of inverter thyristors becomes negligible and therefore, the difference in amplitude of thyristor gating signals becomes a good measure of the relative phase of synchronous machine stator current but not of machine stator current amplitude. Computation of the actual machine phase angle relationship, sin $\theta$, by the use of substitute current signals derived from the difference of inverter thyristor gating signals introduces only negligible error since computation of the machine phase angle relationship sin $\theta$ by angle computation circuit 25 in accordance with equation (2) relies on the ratio of synchronous machine stator currents and not the absolute synchronous machine current amplitudes.

Figure 6:
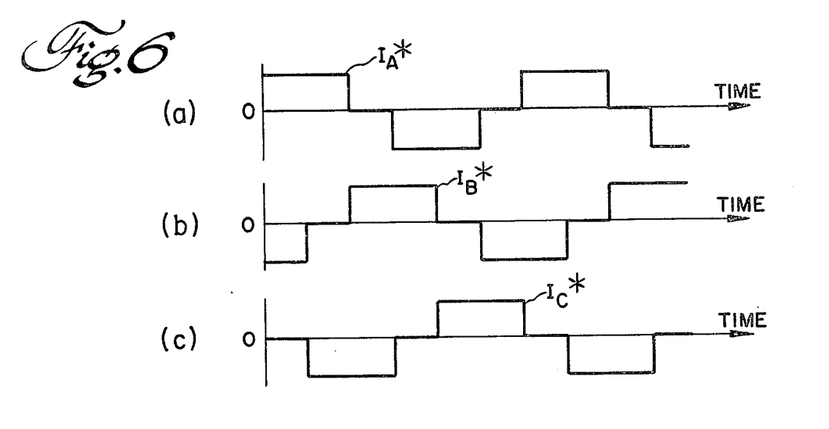
FIGS. 6a, 6b and 6c illustrate the waveforms of simulated stator current signals $I_A^*$, $I_B^*$ and $I_C^*$, respectively, derived by a preselected combination of inverter thyristor gating signals.

FIGS. 6a, 6b and 6c each illustrate the waveforms of substitute current signals $I_A^*$, $I_B^*$ and $I_C^*$, respectively, derived in the manner described in conjunction with the apparatus of FIG. 5. As will be evident to those skilled in the art, substitute currents $I_A^*$, $I_B^*$ and $I_C^*$ closely simulate the synchronous machine stator currents drawn at light or zero machine load conditions.

Figure 7:
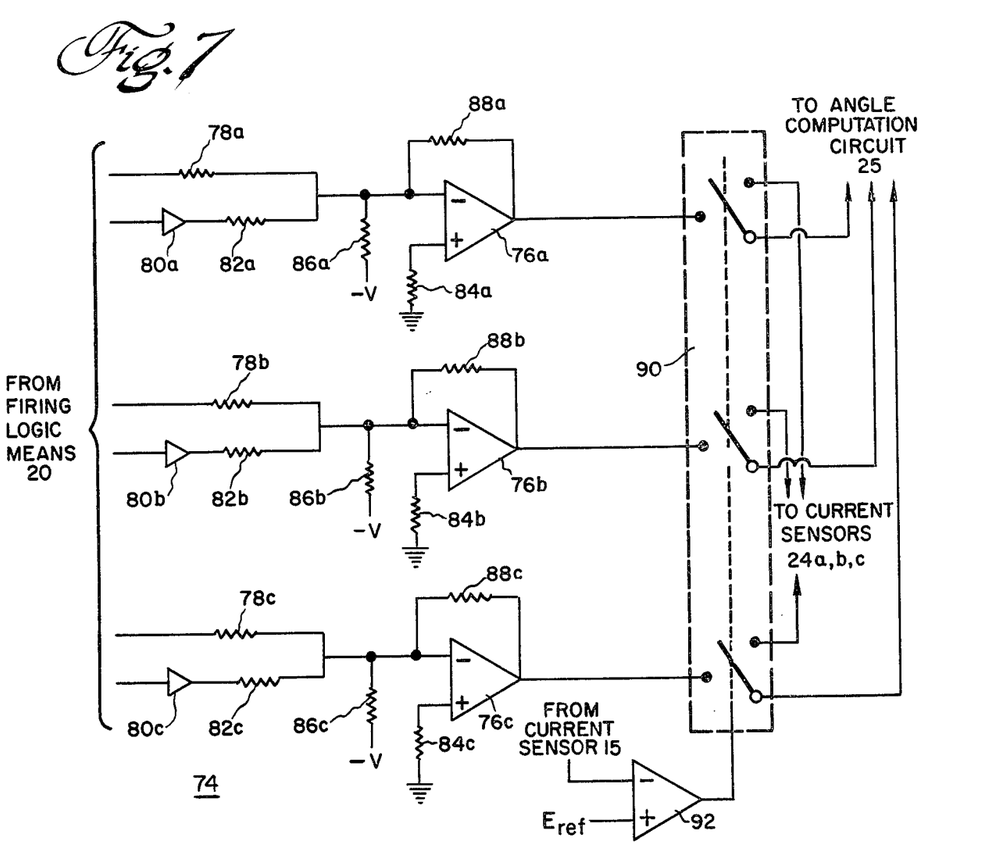
FIG. 7 is a schematic diagram of a substitute current generator which comprises a portion of the control apparatus of FIG. 5.

The details of substitute current generator 74 are shown schematically in FIG. 7. Substitute current generator 74 includes three identically configured differential amplifiers 76a, 76b and 76c, respectively. Each of amplifiers 76a, 76b and 76c is coupled at the invert input by one of resistances 78a, 78b and 78c, respectively, to firing logic means 20 of FIG. 1 to receive a voltage therefrom proportional to the gating period of a respective one of thyristors 16a, 16b and 16c. Differential amplifiers 76a, 76b, and 76c are also each coupled at the invert input by the serial combination of NOT gate 80a and resistance 82a, the serial combination of NOT gate 80b and resistance 82b and the serial combination of NOT gate 80c and resistance 82c, respectively, to firing logic means 20 of FIG. 1 to receive a voltage therefrom proportional to the gating period of thyristors 16d, 16e and 16f, respectively. The noninvert input of each of amplifiers 76a, 76b and 76c is referenced to ground by a respective one of ressistances 84a, 84b and 84c.

Each of amplifiers 76a, 76b and 76 c is supplied at the invert input through one of resistances 86a, 86b and 86c, respectively, with a voltage of magnitude −V where V is the magnitude of thyristor firing voltages supplied by firing logic means 20 to each thyristor. Feedback resistances 88a, 88b and 88c are each coupled between the invert input and output of each of differential amplifiers 76a, 76b and 76c, respectively, for regulating the differential amplifier gain. Typically, the ohmic value of each of resistances 88a, 88b and 88c is equal to 1/30 of the ohmic value of resistances 78a, 78b and 78c, respectively. Resistances 78a, 78b and 78c are each equal in ohmic value to resistances 82a, 82b and 82c, respectively, and to resistances 84a, 84b and 84c, respectively. Coupled in the manner described above, each of differential amplifiers 76a, 76b and 76c supplies an output voltage proportional to the difference in magnitude of thyristor firing voltages supplied to thyristor poles 16a, and 16d, 16b and 16e and 16c and 16f, respectively.

An anlog switch 90 couples angle computation circuit 25 of FIG. 5 to each of current sensors 24a, 24b and 24c of FIG. 1 or to differential amplifiers 76a, 76b and 76c in accordance with the output voltage provided by a comparator 92 which is coupled at the invert input to current sensor 15 of FIG. 1. The noninvert input of comparator 92 is supplied with a voltage of magnitude $E_{ref}$, the voltage magnitude being selected such that during intervals of zero or light synchronous machine loads, angle computation circuit 25 of FIG. 5 is supplied with substitute stator current signals $I_A^*$, $I_B^*$ and $I_C^*$.

Operation of controller 58 of FIG. 5 will now be explained with the assumption that machine 12 is at rest. With switch 64 in the "start" position, a fixed-value machine phase angle command signal sin $\theta^{**}$ is combined with the output signal of current regulator 62 (initially zero) such that a signal, representing the difference therebetween, is impressed at the input to current regulator 62. Control loop 66, having high gain, causes current regulator 62 to substantially instantaneously generate a machine phase angle command signal sin $\theta^*$ substantially equal to the fixed-value phase angle command signal sin $\theta^{**}$. Summing amplifier 70 provides a phase angle difference signal proportional to the difference between sin $\theta^*$, generated by current regulator 62, and sin $\theta$, the actual machine phase angle relationship computed by angle computation circuit 25. This phase angle difference signal is impressed on agnle regulator 72 which provides the frequency command signal $\omega_c$ to firing logic means 20 for adjusting the frequency of inverter thyristor conduction in accordance with the phase angle difference between sin $\theta^*$ and sin $\theta$.

Once synchronous machine 12 has accelerated to a speed of about 5% of the rated machine speed, switch 64 is placed in the "run" position, coupling the input of current regulator 62 to summin amplifier 61. Accordingly, current regulator 62 now generates a phase angle command signal sin $\theta^*$ in accordance with the difference between $I_{DC}^*$, the operator-commanded inverter current link magnitude, and $I_{DC}$, actual inverter link current magnitude. As before, summing amplifier 70 provides a phase angle difference signal according to the difference between sin $\theta^*$ and sin $\theta$ to angle regulator 72, which generates the frequency command signal $\omega_c$ for varying the frequency of inverter thyristor conduction accordingly to maintain load commutation of inverter thyristors and hence inverter-synchronous machine drive synchronism.

During intervals of light machine loads, inverter-synchronous machine drive synchronism continues to be maintained according to the method described above. When machine stator current is of insufficient magnitude to permit angle computation circuit 25 to compute sin $\theta$, (corresponding to the condition $|I_{DC}| < |e_{ref}|$) substitute stator current signals $I_A^*$, $I_B^*$ and $I_C^*$ are supplied by substitute current generator 74 to angle computation circuit 25 in place of the output signals of current sensors 24a, 24b and 24c, respectively, thereby permitting continued computation of sin $\theta$ which allows control circuit 58 to adjust the frequency of inverter thyristror conduction in accordance with the machine phase angle relationship magnitude.

The foregoing describes an apparatus for maintaining synchronism of an inverter synchronous machine drive system over a wide range of motor load conditions, including light or zero motor loads by automatic adjustment of the inverter frequency in accordance with a feedback machine phase angle signal.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

What is claimed is:

1. For use with an inverter-synchronous machine drive system, responsive to operator commands and comprised of a synchronous machine and an inverter configured of a plurality of pairs of solid state switching devices, the switching devices of said pairs of solid state switching devices coupled in series aiding fashion and each of said pairs of solid state switching devices coupled across a unidirectional current source and coupled at the junction between switching devices to a respective synchronous machine phase for supplying current to said synchronous machine when the solid state switching devices are rendered conductive in a predetermined sequence, apparatus for controlling the conduction frequency of solid state switching devices responsive to said operator commands for achieving inverter-synchronous machine synchronism and for maintaining inverter-synchronous machine drive synchronism at light or zero machine load conditions, said apparatus comprising:

first circuit means coupled to said inverter and adapted to be supplied with a parameter command signal proportional to an operator-commanded inverter-synchronous machine drive system parameter magnitude and with a fixed-value phase angle signal proportional to a preselected machine phase angle relationship magnitude, said first circuit means providing a machine phase angle command signal in accordance with said preselected machine phase angle relationship magnitude during intervals of synchronous machine start-up and in accordance with the difference between said operator-commanded inverter-synchronous machine drive system parameter magnitude and the actual inverter-synchronous machine drive system parameter magnitude during intervals other than said synchronous machine start-up intervals;

second circuit means coupled to said inverter and said synchronous machine for supplying a machine phase angle signal proportional to the actual phase angle relationship magnitude between synchronous machine air gap flux and stator current in accordance with the conduction period of said solid state switching devices during intervals of light synchronous machine loads and in accordance with magnitude of synchronous machine current during intervals other than light synchronous machine loads; and third circuit means coupled to said first and said second means and said inverter for controlling the solid state switching device conduction frequency in accordance with the magnitude difference between said first means machine phase angle command signal and said second means machine phase angle to achieve and maintain inverter-synchronous machine synchronism, particularly during said intervals of light synchronous machine loads.

2. The invention according to claim 1 wherein said first means comprises:

a first summing amplifier having a first input adapted to be supplied with said parameter command signal and a second input coupled to said inverter, said first summing amplifier providing at an output a signal which varies in accordance with the difference between said operator-commanded inverter-synchronous machine drive system parameter magnitude and the actual inverter-synchronous machine drive system parameter magnitude;

a second summing amplifier having a first input adapted to be supplied with said preset phase angle signal, a second input and an output;

current regulator means having an input and an output, said output being coupled to said second summing amplifier second input, said current regulator providing said machine phase angle signal at said output in accordance with the magnitude of a signal supplied to said current regulator input; and a switch for coupling said current regulator input to said second summing amplifier output during said intervals of synchronous machine start-up and for coupling said current regulator input to said first summing amplifier output during said intervals other than during synchronous machine start-up intervals.

3. The invention according to claim 2 wherein said current regulator comprises an amplifier having an integral plus proportional transfer characteristic.

4. The invention according to claim 1 wherein said second circuit means comprises:

an angle computation circuit coupled to said synchronous machine for supplying said machine phase angle signal in accordance with input signals proportional to synchronous machine stator currents and synchronous machine terminal voltages; and a substitute current generator circuit coupled to said inverter, to said synchronous machine and to said angle computation circuit, for supplying said angle computation circuit with substitute stator current signals, each proportional to the difference between conduction periods of the switching devices of a respecive one of said plurality of pairs of solid state switching devices, during said intervals of light synchronous machine loads and for supplying said angle computation circuit with stator current signals, each proportional to the actual synchronous machine stator current phase component magnitude, during other than said intervals of light synchronous machine load.

5. The invention according to claim 4 wherein said substitute current generator circuit comprises:

a plurality of differential amplifiers corresponding in number to the number of solid state switching device pairs, each differential amplifier being coupled at first input to said inverter for receiving therefrom a signal proportional to the difference between conduction periods of the solid state switching devices of said respective one of said plurality of pairs of solid state switching devices, each said differential amplifier being coupled at a second input to ground and each providing an output signal proportional to the difference magnitude between input signals supplied to said first and second differential amplifier inputs; and analog switching means responsive to the magnitude of inverter link current, for coupling each one of said plurality of differential amplifiers to said angle computation circuit during said intervals of light synchronous machine loads and for coupling said angle computation circuit to said synchronous machine during intervals other than said synchronous machine load intervals.

6. The invention according to claim 1 wherein said third circuit means comprises:
   a summing amplifier having a first input coupled to said first means and a second input coupled to said second means for providing an output signal which varies in accordance with the difference magnitude of said machine phase angle command signal from said machine phase angle signal; and
   angle regulator means coupled to said summing amplifier and to said inverter for supplying an inverter frequency command signal for regulating inverter solid state switching device conduction frequency in accordance with said summing amplifier output signal.

7. The invention according to claim 6 wherein said angle regulator means comprises an amplifier having an integral plus proportional transfer characteristic.

8. In an inverter-synchronous machine drive system responsive to operator commands and including a synchronous machine, an inverter configured of a plurality of pairs of inverter solid state switching devices, the switching devices of each of said pairs of solid state switching devices coupled in series aiding fashion and each pair of solid state switches coupled across a unidirectional current source and coupled at the junction between series-coupled solid state switching devices to a respective machine phase, the solid state switching devices of said pairs of solid state switching devices being rendered conductive in a predetermined sequence to supply said synchronous machine with alternating current, and apparatus for controlling the conduction frequency of solid state switching devices in accordance with a feedback machine phase angle signal, which varies in accordance with synchronous machine terminal voltages and stator currents, the improvement comprising:
   a substitute current generator circuit coupled to said inverter, said synchronous machine, and to said apparatus for controlling the conduction frequency of said inverter solid state switching devices, said substitute current generator including a plurality of differential amplifiers corresponding in number to the number of solid state switching device pairs, each differential amplifier being coupled at a first input to said inverter for receiving therefrom a signal proportional in magnitude to the difference between conduction periods of the solid state switching devices of said respective one of said plurality of pairs of solid state switching devices, each said differential amplifier being coupled at a second input to ground and providing an output signal proportional to the difference magnitude between input signals supplied to said first and second differential amplifier inputs; and
   analog switching means responsive to the magnitude of inverter link current for coupling each of said plurality of differential amplifiers to said apparatus during said intervals of light synchronous machine loads and for coupling said apparatus to said synchronous machine during intervals other than light synchronous machine load intervals.

* * * * *